(12) United States Patent
Rajavendra Reddy et al.

(10) Patent No.: US 11,449,658 B2
(45) Date of Patent: Sep. 20, 2022

(54) METHODS OF GENERATING INTEGRATED CIRCUIT (IC) LAYOUT SYNTHETIC PATTERNS AND RELATED COMPUTER PROGRAM PRODUCTS

(71) Applicant: Board of Regents, The University of Texas System, Austin, TX (US)

(72) Inventors: Gaurav Rajavendra Reddy, Dallas, TX (US); Mohammad M. Bidmeshki, Plano, TX (US); Georgios Makris, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 191 days.

(21) Appl. No.: 16/681,082

(22) Filed: Nov. 12, 2019

(65) Prior Publication Data

US 2021/0141989 A1    May 13, 2021

(51) Int. Cl.
*G06F 30/398* (2020.01)
*G06F 30/392* (2020.01)
*G06F 119/18* (2020.01)

(52) U.S. Cl.
CPC .......... *G06F 30/398* (2020.01); *G06F 30/392* (2020.01); *G06F 2119/18* (2020.01)

(58) Field of Classification Search
CPC ... G06F 30/392; G06F 30/398; G06F 2119/18
See application file for complete search history.

(56) References Cited

PUBLICATIONS

Li, et al. *Design Space Exploration for Early Identification of Yield Limiting Patterns*, Proceedings of SPIE; SPIE vol. 9781; Mar. 16, 2016; 9 pages.

*Primary Examiner* — Jack Chiang
*Assistant Examiner* — Aric Lin
(74) *Attorney, Agent, or Firm* — Stanek Lemon Crouse & Meeks, P.A.

(57) ABSTRACT

A method can be executed by at least one processor of a computer to generate synthetic Integrated Circuit (IC) layout patterns, where the method can optionally include accessing attribute values of the IC layout pattern features generated using IC layout patterns from at least one at least one previous generation semiconductor fabrication technology node. A synthetic layout pattern can be generated for use in a new generation semiconductor fabrication technology node under development by the following operations (a) assigning a random location in a grid for placement of a feature or portion of a feature constrained by the feature or portion of the feature and an attribute value associated with the feature or the portion of the feature, to a provide a location for the feature or portion of the feature and the associated attribute value; (b) checking the location against design rules for the new generation semiconductor fabrication technology node; (c) changing the location to another random location if the location violates any design rule of the new generation semiconductor fabrication technology node, otherwise placing the feature or portion of the feature at the location that satisfies all design rules of the of the new generation semiconductor fabrication technology node; (d) selecting a next feature/next portion of the feature for placement and (e) performing operations (a) to (d) until determining that all features and portions of all features have been placed with all associated attribute values of the features and portions of the feature.

18 Claims, 9 Drawing Sheets

METHODS OF GENERATING INTEGRATED CIRCUIT (IC) LAYOUT SYNTHETIC PATTERNS AND RELATED COMPUTER PROGRAM PRODUCTS

FIELD

The present invention relates to the field of semiconductors in general, and more particularly, to the generation of layout patterns for the development of semiconductor fabrication processes.

BACKGROUND

When Integrated Circuits (ICs) go into production and large-scale designs are fabricated, the process can be exposed to many new patterns which may have never been seen during the development phase. Such previously unseen patterns continue to appear as more designs are fabricated throughout the lifetime of a process. This may result in high systematic defectivity, as the process may not be optimized for all patterns found in real designs. Unfortunately, once the process is in production, root cause analysis of all pattern-related defects and correction through process changes becomes expensive, time-consuming and, often, intractable. Therefore, common practice is to categorize defect-causing patterns as risky/hard-to-manufacture and restrict their use in future designs.

As an alternative, Early Design Space Exploration (EDSE) can be performed. In EDSE, a large number of synthetic patterns which resemble real layouts are generated up-front during technology development, using only the basic design rules. A database of such patterns enables the foundry to develop a more robust technology node by: (i) using layout-like patterns during lithography recipe development and ensuring that the process is amenable to a large variety of patterns, (ii) designing and characterizing pattern-based test structures on silicon, (iii) formulating Pattern Matching (PM) rules or Design For Manufacturability Guidelines (DFMGs) around high-risk patterns and offering a robust Product Design Kit (PDK) to even the earliest of customers, and (iv) performing lithographic simulations on a large dataset and building accurate detection models to identify sensitive layout patterns which, despite meeting Design Rules, can result in defective products and yield loss due to intricate interaction between the design of the pattern and the semiconductor manufacturing process, which are sometimes referred to as "hotspots," in future designs.

It is known for some EDSE tools to generate synthetic layout patterns by creating a grid of a certain size and populating it with 'unit patterns.' These are customizable 'snippets' or 'blocks' whose side dimensions are equal to the minimal pitch for a given layer of a given technology node. These tools can randomly place such unit patterns on the grid, seeking to produce a realistic layout pattern. However, as shown in FIG. 1, such a random placement method seldom generates realistic patterns. These tools can provide several 'modes' through which the user can attempt to generate more realistic patterns.

In one mode, weights can be added to each unit pattern. The characteristics of the resulting patterns may differ based on the specified weights. A typical pattern obtained using the weighted option is shown in FIG. 2. In a second mode, the user can define templates which predetermine certain areas of the pattern. The tool, then, generates random polygons around the predetermined area, as shown in FIG. 3. It has been suggested that complex patterns or hotspot patterns obtained from previous technology nodes "as is", can be used as templates for generating more realistic designs. However, using such templates may reduce the area available for the tool to place random patterns. Thereby, its ability to explore new design spaces may be restricted. In a third mode, design rules and various heuristics are transformed into a special rule file in a format understandable by the tool, to guide the synthetic pattern generation process. However, producing such constraint files can be extremely time-consuming and may require a significant amount of human effort and expertise. In a fourth mode, which is more automated, realistic patterns may be produced with less human involvement. Although the generated patterns appear to be realistic, those patterns may tend to cover a limited portion of the design space. An example of such a pattern is shown in FIG. 4.

Current synthetic pattern generation tools offer various modes and options, enabling the user to make a tradeoff between the amount of human-effort involved and the quality/realism of patterns generated. However, these tools still may offer limited coverage of the design space, thereby not exploring the full potential of EDSE in supporting robust early technology development.

SUMMARY

Embodiments according to the present invention can provide methods of generating integrated circuit layout synthetic patterns for early design space exploration and related computer program products.

Pursuant to these embodiments, a method can be executed by at least one processor of a computer to generate synthetic Integrated Circuit (IC) layout patterns for early design space exploration, where the method can optionally include accessing attribute values of the IC layout pattern features generated using IC layout patterns from at least one previous generation semiconductor fabrication technology node. A synthetic layout pattern can be generated for use in a new generation semiconductor fabrication technology node under development by the following operations (a) assigning a random location in a grid for placement of a feature or portion of a feature constrained by the feature or portion of the feature and an attribute value associated with the feature or the portion of the feature, to provide a location for the feature or portion of the feature and the associated attribute value; (b) checking the location against design rules for the new generation semiconductor fabrication technology node; (c) changing the location to another random location if the location violates any design rule of the new generation semiconductor fabrication technology node, otherwise placing the feature or portion of the feature at the location that satisfies all design rules of the new generation semiconductor fabrication technology node; (d) selecting a next feature/next portion of the feature for placement and (e) performing operations (a) to (d) until determining that all features and portions of all features have been placed with all associated attribute values of the features and portions of the features.

In some embodiments according to the invention, a method, executed by at least one processor of a computer, of generating synthetic Integrated Circuit (IC) layout patterns, can be provided by accessing probability distributions of attribute values of the IC layout pattern features generated using IC layout patterns from at least one previous generation semiconductor fabrication technology node. A synthetic layout pattern can be generated for use in a new generation semiconductor fabrication technology node by the following operations: (a) placing a first portion of a layout pattern feature to include a selected attribute value for the first portion of the layout pattern feature, wherein the selected attribute value of the first portion is sampled from the probability distribution of the attribute value for the first portion of the layout pattern feature being placed and (b) moving the first portion of the layout pattern feature to a new location if placement of the first portion of the layout pattern feature with the selected attribute value violates any design rule for the new generation semiconductor fabrication technology node until the design rule is not violated.

DETAILED DESCRIPTION OF EMBODIMENTS ACCORDING TO THE INVENTION

Figure 1:
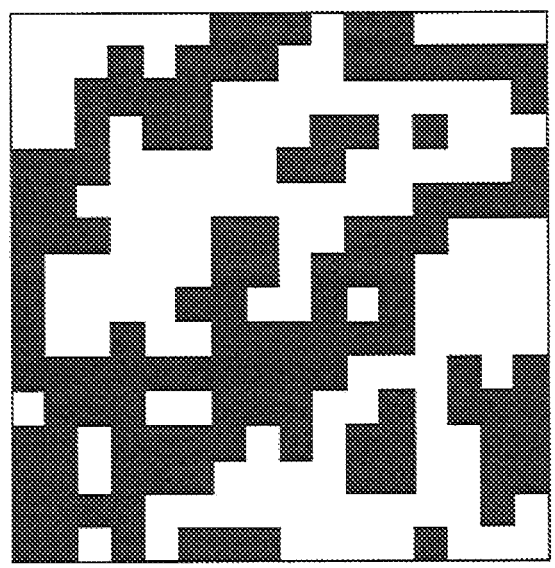
FIGS. 1-4 illustrate exemplary patterns generated using a conventional approach as described herein.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, a standard cell-based Integrated Circuit (IC) layout may not be a random arrangement of polygons; rather, these polygons can be characterized as having a specific purpose. Moreover, besides being governed by design rules, these polygons may also exhibit an additional set of features which depend on their actual purpose (i.e. function) in the IC design. For example, in some embodiments according to the invention, features can include the following: (i) polygons used to supply power to transistors, which can take the form of a vertically oriented rectangle where one end of the rectangle branches out of a power rail and the other end terminates at a source/drain, (ii) stacked-via enclosures can take the form of isolated rectangles with relatively small dimensions, and (iii) source-to-drain connections and/or cell-to-cell connections that can take the form of a 'path' which may have multiple turns and branches.

Therefore, in order to generate more realistic IC layout patterns the polygons according to the invention can exhibit the characteristics of real layouts (rather than random polygons) and represent 'paths', 'power rail branches' etc., which are essentially 'polygons with a meaning' where the meaning is related to the function within the IC's operation that the polygon promotes. Accordingly, in some embodiments, a controlled random walk-based approach is taken to generating patterns, where every aspect of a pattern is abstracted as a random walk performed under certain constraints. While the randomness in the proposed method ensures that design space exploration is not restricted, the constraints ensure that the 'meaning' of every polygon is preserved, thereby, making the resulting patterns more realistic than in conventional approaches.

As further appreciated by the present inventors, with the introduction of every new generation layout technology node, the critical dimensions, standard cell sizes and layer pitch continue to shrink. However, fundamental characteristics of standard cells, such as the number of internal connections, type of connections, and Input/Output (IO) access methods may not change as significantly and may actually be relatively independent of the changes from generation to generation. Indeed, most of these attributes may be governed, for example, by the principles of Complementary Metal Oxide Semiconductor (CMOS) logic design and can be, therefore, relatively technology independent.

As further appreciated by the present inventors, an increase in the 'realism' of the patterns synthesized for a new generation layout technology node may be achieved by "mining" actual IC designs from previous generation layout technology nodes to obtain statistics regarding various technology-independent features. In some embodiments according to the invention, for example, IC designs may be decomposed into patterns of a certain size, which may then be used for data-mining. Accordingly, features-of-interest (i.e., layout features that tend to be relatively independent of the layout technology node) can be "mined" in the previous generation(s) to provide attributes (i.e., data related to the physical instantiation of those features in the design(s) that is mined). For example, in some embodiments, paths in a layout can be mined to provide the number of paths in the pattern, the number of turns in a path, the length and width of individual segments of the paths, the number of branches on the paths, power rails can be mined to provide the probability of a pattern having a power rail, the number of branches on a power rail, the existence of via-enclosed-metals (VEM) can be mined to provide the number of VEMs, etc. Accordingly, features in previous generation layouts can be mined to provide attributes of those features (such as the number of times those features occur or particular dimensions associated with the features) for use in synthesizing patterns for the new generation layout that is under development.

It will be understood that, as used herein, the term "previous generation semiconductor fabrication technology node" can refer to previous or older semiconductor manufacturing processes, including the associated design rules and feature sizes, relative to the technology node that is under development (i.e., the new generation semiconductor fabrication technology node). For example, if the current technology node involves forming 130 nm feature sizes, a previous generation technology node may refer to one that involved forming 180 nm feature sizes.

It will be further understood that, in some embodiments, previous and new technology nodes can be defined relative to a particular technology, such as for memory technology or radio frequency resonator technology. Accordingly, what may be defined as previous or new may be technology dependent.

In some embodiments, the mined data is used to generate probability density functions (PDFs) for specific attributes of the features-of-interest. To ensure that the generated statistics are technology-independent, various features such as widths, lengths, patterns sizes etc., can be normalized to the corresponding layer pitch of the technology node used for mining, in order to provide normalized PDFs that can be used to sample various aspects of the patterns generated for the current technology node.

It will be understood that the information mined from previous technology nodes neither forces the generation of the 'same' patterns as before, nor constrains/prevents exploring new design spaces. The underlying reason for this is that the pattern generation process is still random; the mined information and learned feature distributions are used as a starting point which is then guided towards generating realistic patterns. Still further, in some embodiments, the mean and standard deviation of certain aspects can be provided as input so as to generate patterns from various design corners or emphasize specific characteristics.

Figure 5:
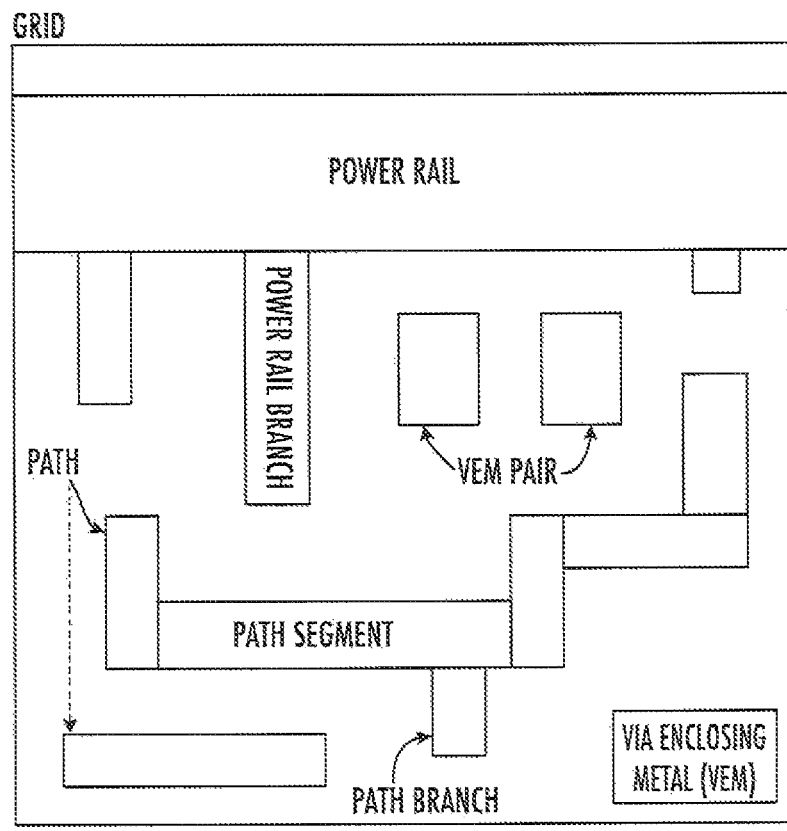
FIG. 5 illustrates an exemplary synthetic pattern in a grid including a plurality of features and portions of features and having associated attribute values generated using the approach described herein in some embodiments according to the invention.

It will be understood that the names assigned to the features of layout patterns described herein are illustrated in FIG. 5. FIG. 5 illustrates an exemplary synthetic pattern in a grid including a plurality of features and portions of features an associated attribute values generated using the approach described herein in some embodiments according to the invention.

According to FIG. 5, the area wherein a pattern is created is called the grid. Features shown as wide metal lines running horizontally across the entire length of a pattern are termed "power rails" and provide the function of distributing power to components within the grid. Features shown as long metal (or otherwise conductive) lines, often containing multiple turns, are called "paths" and provide the function of distributing signals to components within the grid. Portions of a path between turns in the path are referred to as "segments" and can provide the same function as the path. Moreover, segments can be described as portions of a feature where the portion maintains a relationship with the overall feature. For example, a segment of a path can be described as a portion of a feature as the segment is included with the larger path (i.e., feature). Features shown as polygons connected to power rails and paths are termed "power rail branches" and "path branches," respectively. Similarly, the "power rail branches" and "path branches" can be described as portions of features as those portions have a relationship with another feature, in this case a physical connection to one another. Features shown as small isolated rectangles are referred to as Via Enclosing Metals (VEMs) and VEMs which are horizontally aligned with each other are called VEM pairs.

As described herein, attributes can be associated with features (or portions of features) to describe the physical instantiation of the respective feature as provided by the data mining of layouts produced by previous semiconductor fabrication technology nodes. For example, a power rail branch feature can have an associated attribute value that represent the probability that a number of power rail branches occur in a grid with a power rail feature. Further the features (or portions of features) can have more than one associated attribute value. For example, the power rail branch may have a second attribute value for the dimensions of the power rail branch. It will be further understood that although numerous examples of features and/or portions of features are given along with respective attribute values, other elements of a pattern may represent a feature, or a portion of a feature, when those elements provide a function similar to those described herein. Accordingly, this disclosure will not be construed as a limitation on the features and attribute values of those features that can be mined from previous generation IC layouts and used to generate PDFs, and synthetic layout patterns as described herein.

It will be understood that the generation of synthetic patterns for the next generation of layout can be based on the desired pattern size and the fundamental design rules, such as minimum width, space, notch, etc., for the new generation layout which may be provided as inputs. It will be understood that the generated synthetic patterns may contain several of the features herein, but not every pattern. The features and attributes to be included in a pattern can be determined by sampling the corresponding Probability Density Function (PDF) of each feature attribute. For example, where the feature is a "path" the corresponding PDFs may relate to different attributes for the path, such as the number of paths, the number of turns in the path, and/or the physical dimensions of the path. Therefore, each of the PDFs for these attributes can be sampled in order to generate the attribute values for generation of the synthetic pattern. The probabilistic nature of this method can enable the exploration of a greater portion of the design space (including various corners in the design space) and may increase the diversity of the patterns that are synthesized.

Once the PDFs have been sampled, each of the features can be abstracted as a different randomized step-wise placement of the feature (or portions of the feature) to provide the feature in the grid to have the attribute value that is associated with the feature (or with each portion of the feature. Accordingly, while some aspects of the placement are randomized, the placement is constrained or limited by the identity of the feature as well as the attributes of the feature and the design rules for the new generation layout. This approach is sometimes referred to herein as a "controlled random walk."

For example (i) a power rail can be a random walk with only one horizontal step, (ii) a power-rail branch can be a random walk with a single vertical step, with its initial point randomly chosen anywhere along an edge of the power rail, (iii) a path can be implemented as a random walk with many continuous steps, where an anti-clockwise/clockwise right-angled turn is made at the end of every step, (iv) a path branch may be similar to a path but its initial point lies on an edge of a pre-existing path, and (v) VEMs and VEM pairs can be implemented as single-step walks. In some embodiments, a grid with a resolution of him and dimensions equal to the pattern size can be created and features can be generated using the following exemplary operations:

```
def GenPattern (features) :
      Input:      Pattern features, e.g. presence of power rail, power rail
                  branch count, path count, VEM count, etc.
      Result: A random pattern with requested features
      /*       Create a new grid                           */
1   |    grid = Grid ( features.gridSize )
2   |    if features.hasPowerRail == true:
    |         /*       Generate power rail and its branches
    |                   */
3   |    |    TakeRandomWalks (grid, type = PowerRail, count = 1)
4   |    |    TakeRandomWalks (grid, type = PowerRailBranch,
5   |    |    count = PowerRailBranch,
    |         /*  Generate paths                           */
6   |    TakeRandomWalks (grid, type = Path,
7   |    count = features.pathCount
    |    /* Generates path branches                        */
8   |    TakeRandomWalks (grid, type = PathBranch
9   |    count = features.pathBranchCount)
    |    /*       ...                                      */
    |    /*       Similarly, all other pattern features
    |             are implemented                          */
10  |    return grid
```

In some embodiments, attribute values such as the number of steps, the width and length of every step, etc., may be obtained by sampling their respective PDFs. To take the first step, a random location within the grid and a random direction may be chosen. The area on the grid where the step is to be taken is first checked for vacancy. The area surrounding the step is also checked in order to ensure that minimum spacing rules are not violated. If either of the checks fails, the walk may be attempted in the opposite direction. If the first step is unsuccessful due to obstruction in both directions, a new initial point may be obtained and the walk can be restarted.

If congestion is encountered in subsequent steps of a path (exhibited by difficulty in placing features or portions of a feature without violating a design rule), the process may remove previously placed features or portions of features that maintain a relationship with the feature encountering the congestion, new distance values may be obtained from the PDF, and the steps may be reattempted in the same order. The process continues until either the walk is complete or a termination criterion is met. The approach described above may be implanted, in some embodiments according to the following operations:

```
def TakeRandomWalks(grid, type, count) :
        Input: Grid to create pattern on, walk type and count
        Result: Adds requested features to the grid
1    | for i in range (count) :
     |       /*     Get walk specific parameters such as
     |              step count, widths, distances, etc.
     |              by sampling corresponding PDFs         */
2    |    | walkParameters = samplePDF ()
     |       /*     get random initial point               */
3    |    | initPoint = random 0
4    |    | step = 0
5    |    | maxStep = 0
6    |    | while step < StepCount
     |          /*  get random direction                   */
7    |    |    |   stepDirection = random 0
8    |    |    |   if step and surrounding is vacant:
9    |    |    |   |   take the walk and add it to the grid
10   |    |    |   |   step+ = 1
11   |    |    |   |   maxStep = max(step, maxStep)
12   |    |    |   else:
     |                /* try the opposite direction        */
13   |    |    |   |   stepDirection = DirOpposite(stepDirection)
14   |    |    |   |   if step and surrounding is vacant:
15   |    |    |   |   |   take the walk and add it to the grid
16   |    |    |   |   |   step+ = 1
17   |    |    |   |   |   maxStep = max(step, maxStep)
18   |    |    |   |   else:
19   |    |    |   |   |   if step == 0:
     |                            /* this is the first step
     |                                                     */
20   |    |    |   |   |   |   repeat by going to
     |                            line 3 until walk
     |                                    completes, or termination criteria is
     |                                    met
21   |    |    |   |   |   else:
     |                        /*  take a step back and try
     |                            again                    */
```

| | | | | | | | |
|---|---|---|---|---|---|---|---|
| 22 | | | | | | | remove last step from the grid |
| 23 | | | | | | | step = $maxStep - 1$ |
| 24 | | | | | | | get a new distance |
| 25 | | | | | | | repeat a few times by going to line 8 |
| 26 | | | | | | | if unsuccessful after multiple trials in line 25: |
| | | | | | | | /* take two steps back & try again */ |
| 27 | | | | | | | remove two last steps from the grid |
| 28 | | | | | | | step = $maxStep - 2$ |
| 29 | | | | | | | get a new distance |
| 30 | | | | | | | repeat by going to line 8 until walk completes or termination criteria is met |
| 31 | return | | | | | | |

Figure 6:
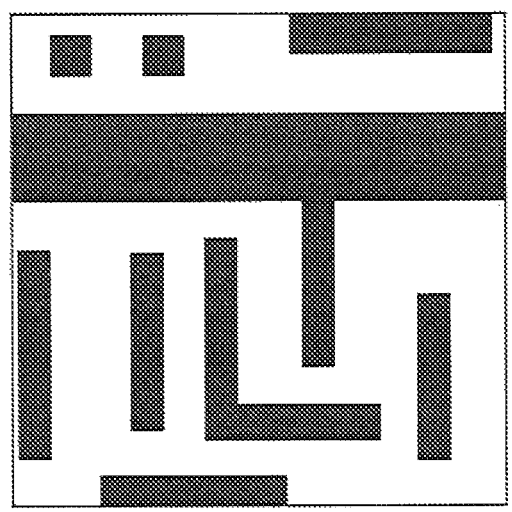
FIGS. 6-8 illustrate exemplary embodiments of synthetic patterns generated using processes in some embodiments according to the invention.
Figure 7:
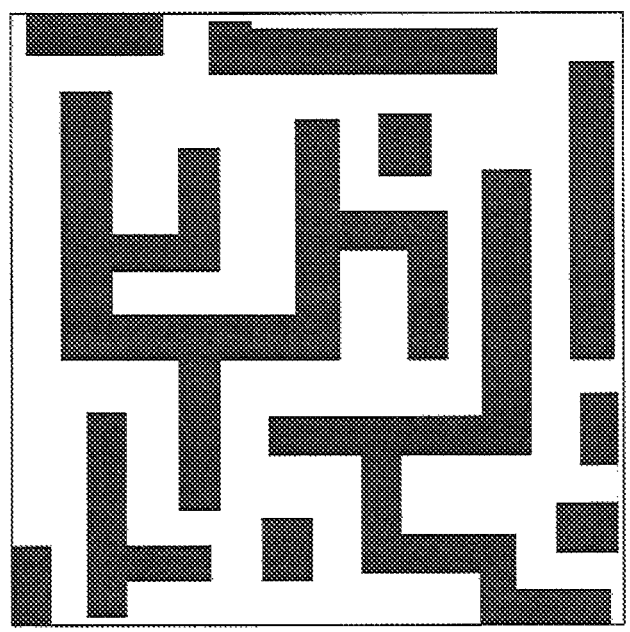
Figure 8:
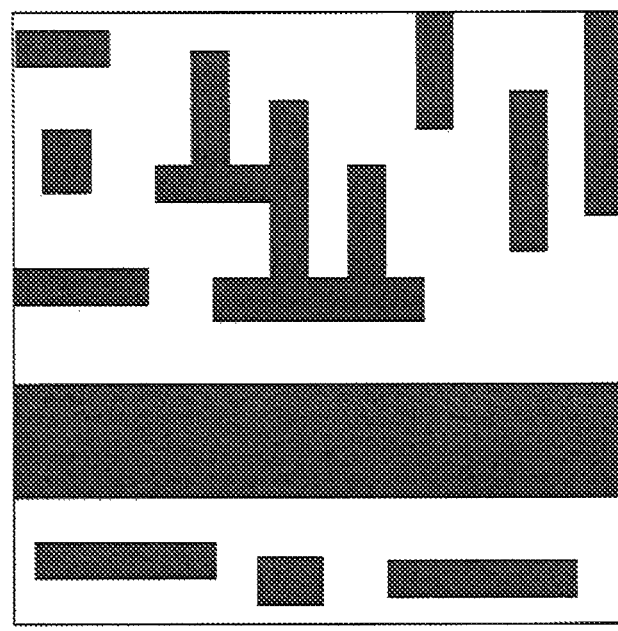
Figure 9:
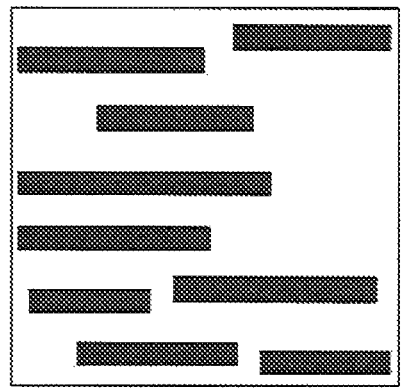
FIGS. 9-12 illustrate exemplary embodiments of custom synthetic patterns generated using processes in some embodiments according to the invention.
Figure 10:
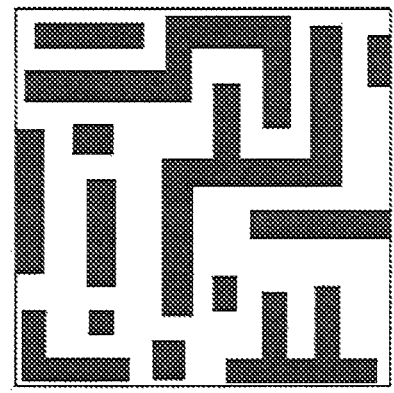
Figure 11:
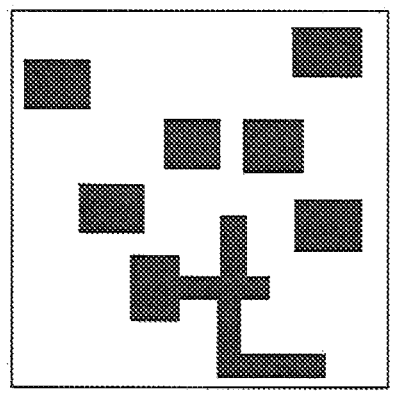
Figure 12:
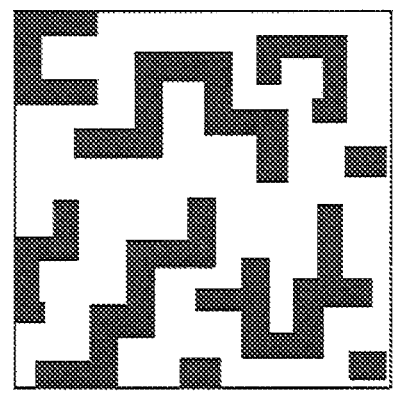

FIGS. 6-8 illustrate exemplary embodiments of synthetic patterns generated using the approach described above in some embodiments according to the invention.

Generating synthetic patterns using a large number of walks may cause some of the subsequent walks to be impeded by congestion. Consequently, some attributes values, such as the direction in which a feature extends, may depend on the spatial orientation of the polygons (e.g., portions of features) that have already been placed by previous constrained randomized placements (i.e., controlled-random walks). It will be understood, however, that this does not necessarily reduce randomness because all preceding polygons are placed randomly and their spatial arrangement is different for each new pattern. To reduce congestion, however, walks can be structured to be taken in a specific order in some embodiments. For example, in some embodiments, power rails and associated power rail branch features may be processed first in generating a synthetic pattern, followed by VEM pairs, followed by Paths and the associated path branches, and then individual VEMs.

In further embodiments, customized synthetic patterns can be generated to target specific applications, rather than only generating synthetic patterns which resemble real layouts. For example, while performing silicon validation for technology development, patterns from various design corners which push the process to its extremes may be beneficial. These could be patterns with a large number of corners, high-density, parallel-paths with varying widths and line-end positions, VEM clusters, low density patterns with isolated VEMs, etc. An effective synthetic pattern generation tool should be versatile enough to generate such custom patterns-of-interest.

A custom pattern generation process should also be intuitive and user-friendly. In some embodiments according to the invention, a user can generate full-custom patterns by directly controlling various parameters such as number of VEMs, corners, path lengths, widths, branches etc., whereas in conventional arrangements a user may only have control over density and a few basic design rules. Examples of custom patterns generated automatically using embodiment according to the invention are shown in FIGS. 9-12.

Embodiments according to the present invention can also be adapted to a range of processes such as Self-Aligned Double/Triple Patterning (SADP/SATP). Unlike conventional approaches, embodiments according to the invention can seamlessly handle many major technology inflections without any changes. Examples illustrating such capabilities include:

1) Some newer generation layout approaches can feature additional layers that are dedicated to local interconnections between power-rails and transistor source/drains, thereby, eliminating such design features from lower Back-End-Of-Line (BEOL) layers. Embodiments according to the present invention, can accommodate such changes by setting the number of power-rail branches to zero; and 2) In process nodes using SADP/SATP, drawn metal lines are required to be increasingly uniform and only a few, if any, corners are allowed. Embodiments according to the present invention can adhere to such design requirements by setting the number of corners on a path to zero, or a small value.

The performance of embodiments according to the invention are evaluated and contrasted to some conventional approaches based on the two primary objectives of synthetic pattern generation methods, namely (i) generation of a diverse set of patterns which cover a large portion of the design space, and (ii) generation of realistic patterns which closely resemble actual IC layouts.

To evaluate embodiments according to the present invention, experiments were performed in a 45 nm technology node. An open-source circuit was placed and routed using the Nangate open cell library to obtain baseline designs. The basic design rules from the same PDK were provided as inputs to both an embodiment according to the present invention and tool using a conventional process as described herein. As a prior node, a 65 nm technology was considered and patterns from a single design at this node were used to provide the technology independent PDFs.

It will be understood that, as used herein, patterns captured from real designs are referred to as 'Design patterns', patterns obtained from conventional process as 'conventional patterns', and patterns generated by an embodiment according to the present invention as 'Inventive patterns.' All patterns correspond to Metal1 and have their side dimensions equal to 8.5*layer pitch, which translates to about 1100 nm. All generated patterns were subjected to a full Design Rule Check (DRC). On average, about 14% of the conventional patterns and about 7% of inventive patterns failed DRC. Most such DRC failures were found on complex rule-checks, both for inventive patterns and for conventional patterns. Only DR-clean patterns were used in the rest of the analysis.

Both inventive, and the conventional process were operated in their fully automated modes which require minimal human involvement. For the conventional process, this translates to mode 4.

To determine the amount of design space explored by a pattern generation tool, we used One-Class Classifiers (OCCs). OCCs are Machine Learning (ML) based models which are trained using a dataset containing samples belonging to a single class and learn a decision boundary that encompasses them. When a test set is presented to the trained OCC, the samples which fall within the learned boundary are classified as 'inliers', while the rest are classified as 'outliers'. Prior to presenting layout snippets to an ML model, we first converted them into numerical 'feature vectors'. For this purpose, we used the coordinate transform method. Then we used a one-class Support Vector Machine (SVM) with a Radial Basis Function (RBF) kernel as the OCC.

While training ML models, such as OCCs, some model parameters may require fine-tuning. Such hyper-parameters control, for example, the 'conservativeness' of the classifier while learning the decision boundary. To preserve fairness, we ensured that the same hyper-parameter values are used throughout the experiments. The rationale of the experiment is that, if an OCC model is trained using patterns produced by a synthetic pattern generation tool and it is tested using actual patterns from the entire design space, the percentage of inliers provides a good estimate of the synthetic pattern generation tool effectiveness in covering the design space. To this end, we generated 50,000 conventional patterns and an exemplary embodiment including 50,000 inventive patterns, and used them to train two separate OCCs, which we then tested using a common dataset of 50,000 design patterns. The results are reported in Table I:

TABLE I

OCC results from design space coverage analysis

| Training dataset | Testing dataset | Inliers | Outliers |
|---|---|---|---|
| Conventional patterns | Design patterns | 26.61% | 73.39% |
| Exemplary embodiment patterns | Design patterns | 73.5% | 26.5% |
| Exemplary embodiment patterns (tail-biased) | Design patterns | 84.71% | 15.29% |

Figure 13:
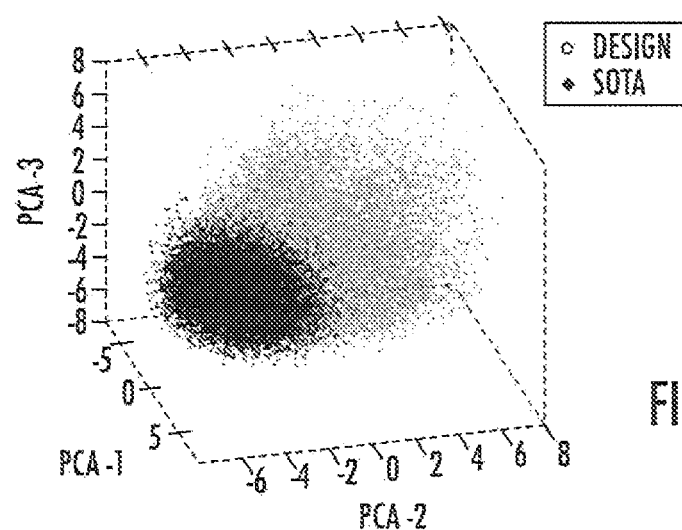
FIG. 13 illustrates results of experiments which contrast the distribution of conventional patterns against the distribution of design patterns in some embodiments according to the invention.
Figure 14:
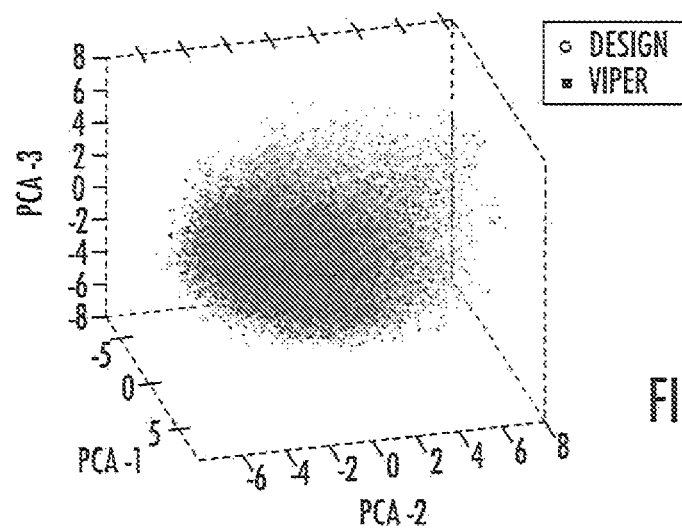
FIG. 14 illustrates results of experiments which contrast the distribution of inventive patterns against the distribution of design patterns in some embodiments according to the invention.

To better visualize the results, we performed Principal Component Analysis (PCA) on the design patterns, projected inventive and conventional patterns onto the same space, and plotted the first three principal components in FIG. 13. As observed in FIG. 13, which contrasts the distribution of conventional patterns against the distribution of Design patterns, the overlap is rather small, resulting in a low percentage of inliers (i.e., 27%) in our experiment. On the other hand, this overlap is significantly larger when we contrast the distribution of inventive patterns against the distribution of Design patterns. As shown in FIG. 14, inventive patterns are spread out in a larger area, thereby explaining the higher percentage of inliers (i.e., 73%) in our experiment.

In order to further guide the embodiment according to the invention towards exploring a broader design space, we used the PDFs learned from the previous technology node as a starting-point and biased them towards generating more samples at the tails of the distribution for various parameters, such as line widths, number of corners, etc. The biased PDFs were used to generate a new set of 50,000 patterns, referred to as Tail-Biased patterns. Using this set of patterns, the classification procedure was repeated and the results are reported in Table I.

Figure 15:
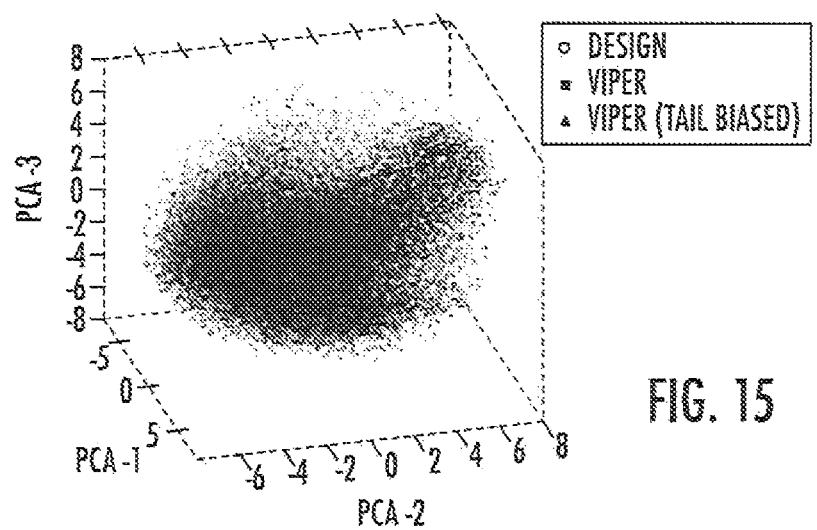
FIG. 15 illustrates results of experiments which contrast the distribution of tail-biased inventive patterns against both the design patterns and the initial set of inventive patterns in some embodiments according to the invention.

In FIG. 15, we contrasted the distribution of tail-biased patterns against both the Design patterns and the initial set of inventive patterns. Evidently, tail-biased patterns explore design spaces well beyond the initial set of inventive patterns, resulting in even higher design space coverage and inlier percentage (i.e., 85%), which is approximately 3× larger than the conventional patterns. Since, the tail-biased patterns achieve the highest design space coverage, we used them as inventive patterns for the rest of the analysis.

While the results described above corroborate that the synthetically generated layout patterns can cover a large portion of the design space, it is also important to ensure that the patterns are realistic. In other words, they should originate from the same distribution as actual design patterns. We resorted once again to OCCs in order to evaluate the effectiveness of inventive and the conventional process in generating realistic patterns.

The rationale of our experiment was that all realistic design patterns are governed by certain common characteristics and originate from a certain—yet unknown—distribution. Therefore, if we train an OCC to learn the boundaries enclosing that distribution in the numerically transformed layout feature space, we can then use the trained model to determine whether the patterns generated by the synthetic pattern generation tools fall within the learned boundary. Patterns resembling realistic layout snippets would be, then, classified as inliers, while unrealistic patterns would be classified as outliers. For instance, if a synthetically generated pattern is blank, or if it only contains one polygon covering the entire pattern area, it would likely be substantially different from the majority of real design patterns in the numerically transformed layout feature space and would, therefore, be classified as an outlier.

In this analysis, we trained an OCC using as known 'real patterns' the same set of design patterns which were described herein. We then used the same trained classifier to test both the conventional patterns and the tail-biased inventive patterns. The results are summarized in Table II:

TABLE II

OCC results from pattern realism analysis

| Training dataset | Testing dataset | Inliers | Outliers |
|---|---|---|---|
| Design patterns | Conventional patterns | 85.09% | 14.91% |
| Design patterns | Exemplary embodiment patterns (tail-biased) | 90.57% | 9.43% |

Figure 16:
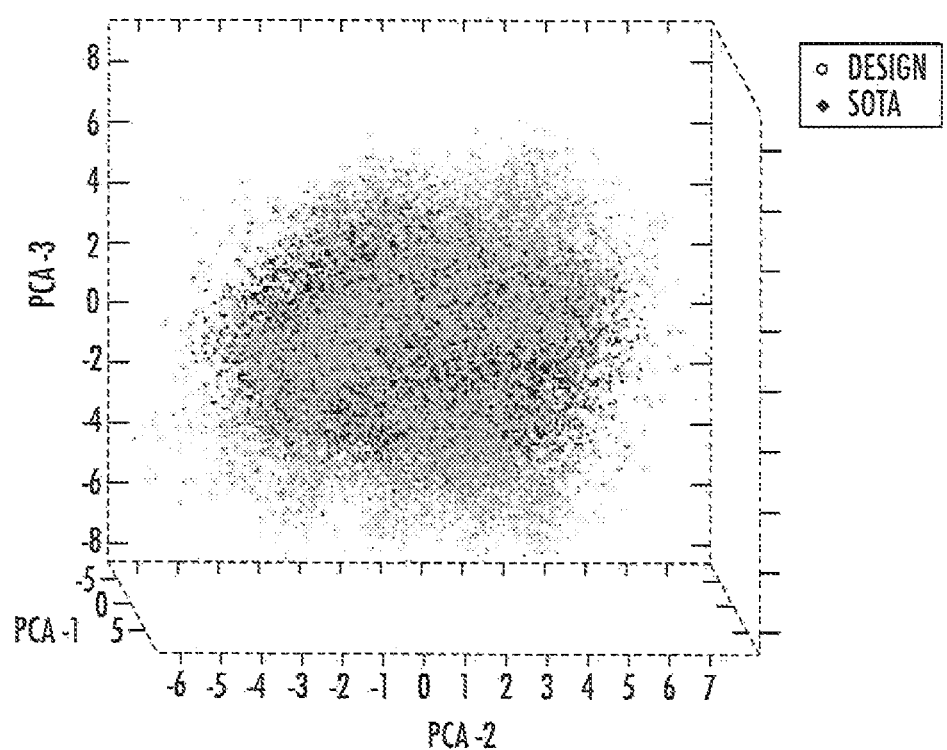
FIG. 16 illustrates a Principal Component Analysis (PCA) on conventional patterns and projects the actual design patterns onto the same space in some embodiments according to the invention.
Figure 17:
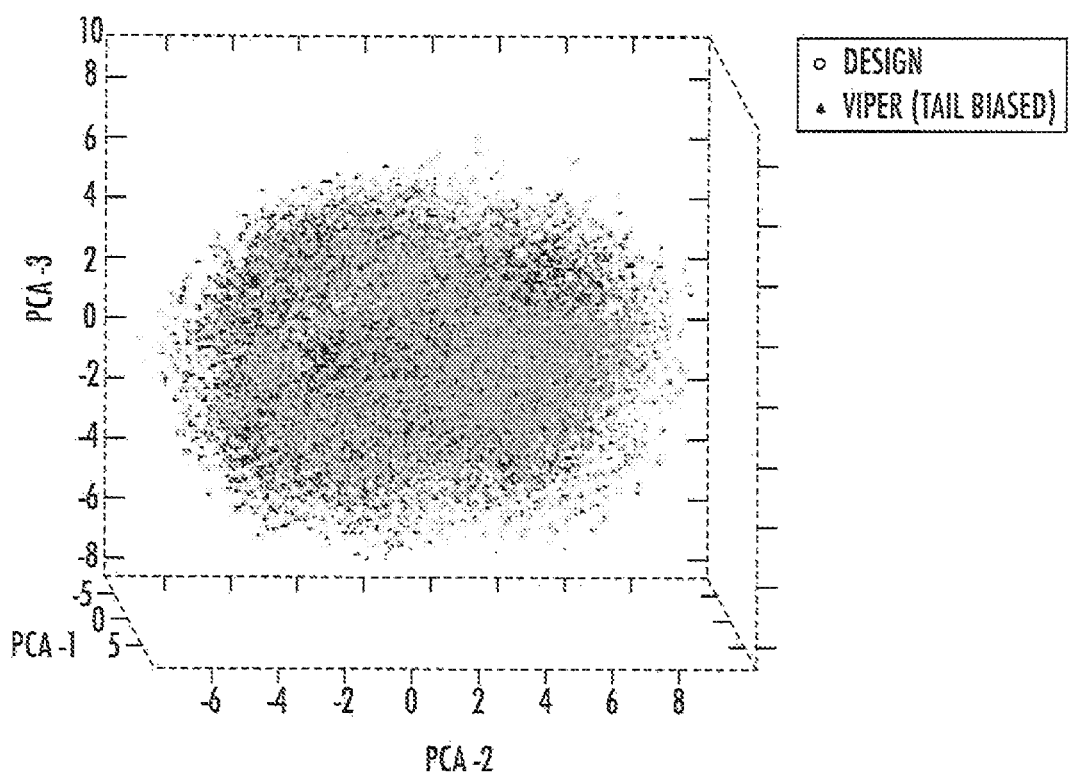
FIG. 17 illustrates a PCA on tail-biased inventive patterns and actual design patterns are projected onto its space in some embodiments according to the invention.

For better visualization, we performed PCA on the conventional patterns and project the actual design patterns onto the same space, as shown in FIG. 16. A similar plot, where PCA is performed on inventive patterns and actual design patterns are projected onto its space, is shown in FIG. 17. In both cases, we observe that the vast majority of conventional and inventive patterns, i.e., 85% and 90%, respectively, lie within the boundary of real design patterns, signifying that they belong to the same distribution. These results confirm that the patterns generated by both the conventional tool and inventive are realistic and resemble the characteristics of actual designs. Moreover, we note that embodiments according to the invention tend to perform slightly better in generating realistic patterns, despite exploring a 3× larger portion of the design space.

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and due to the large size of many circuit designs and the patterns that an embodiment of this invention may generate, various electronic design automation tools are configured to operate on a computing system capable of concurrently running multiple processing threads. The components and operation of a computer network having a host or master computer and one or more remote or servant computers therefore will be described with reference to FIG. 18. This operating environment is only one example of a suitable operating environment, however, and is not intended to suggest any limitation as to the scope of use or functionality of the disclosed technology.

Figure 18:
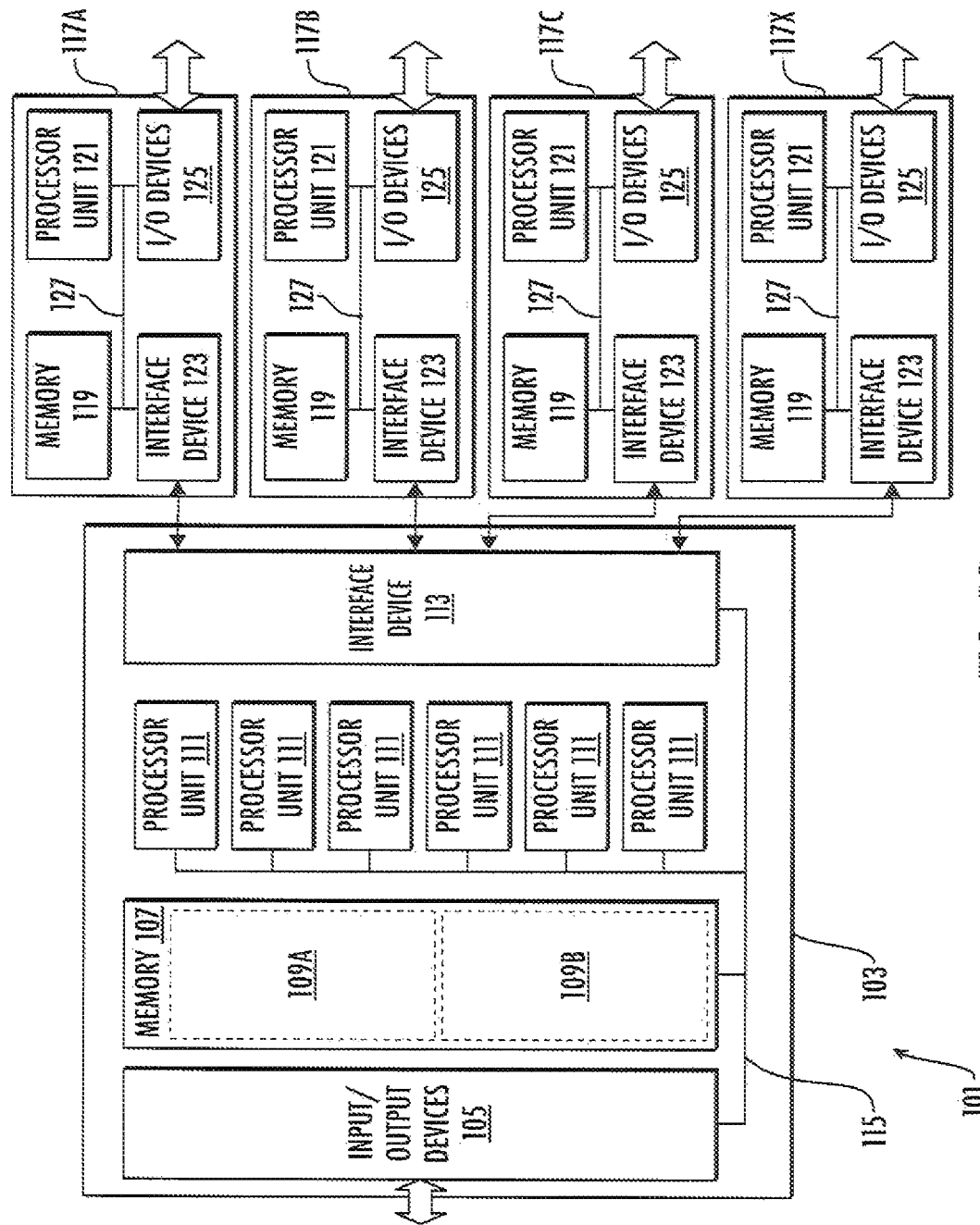
FIG. 18 illustrates an example of a computing system that may be used to implement embodiments according to the invention.

In FIG. 18, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel. Pentium. or Xeon microprocessors, Advanced Micro Devices Athlon™ microprocessors or Motorola 68K/Coldfire. microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 19:
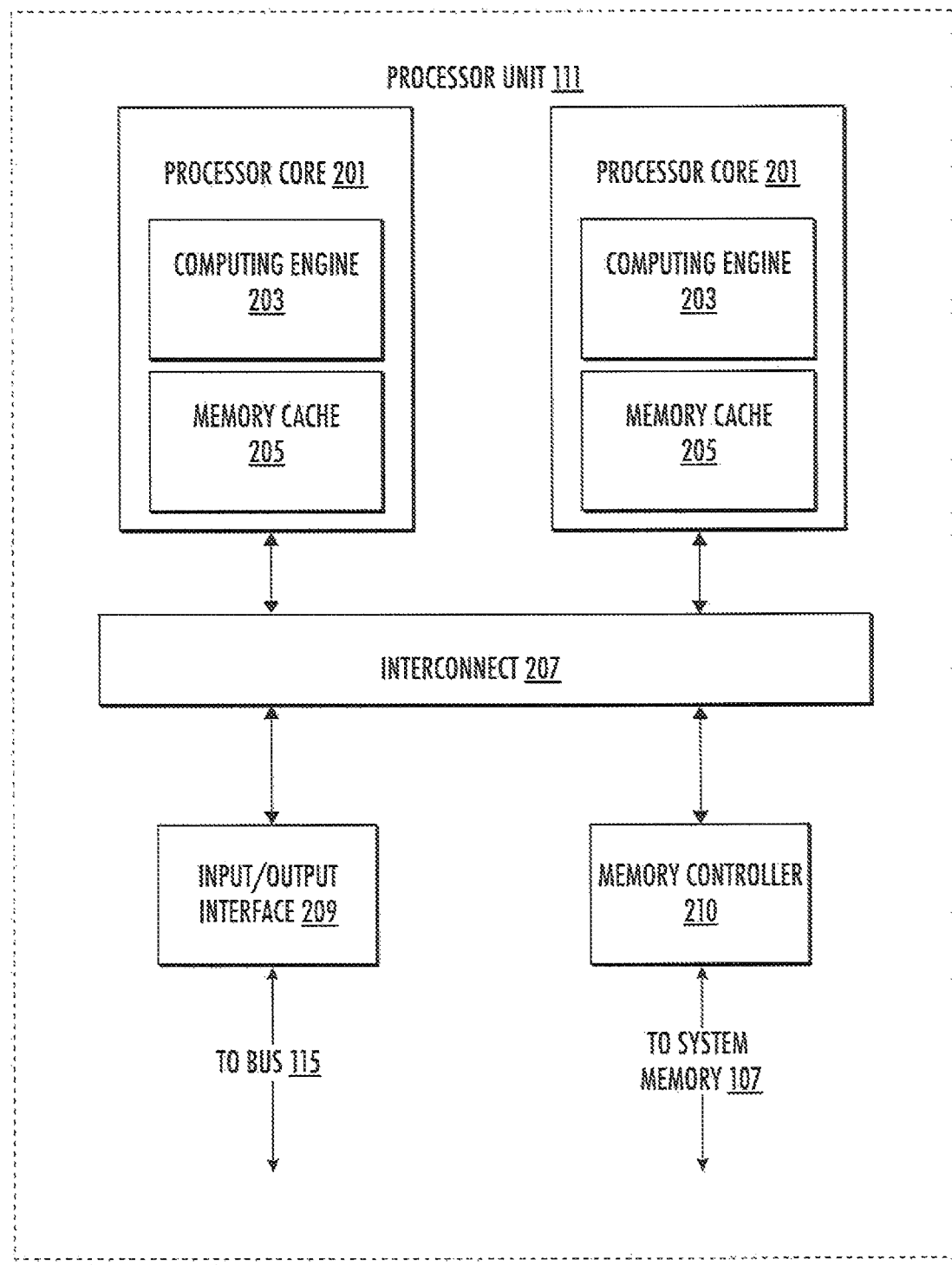
FIG. 19 illustrates an example of a multi-core processor unit that may be used to implement embodiments according to the invention.

With some implementations of the disclosed technology, the master computing device 103 may employ one or more processing units 111 having more than one processor core. Accordingly, FIG. 19 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 19 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 18, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Figure 2:
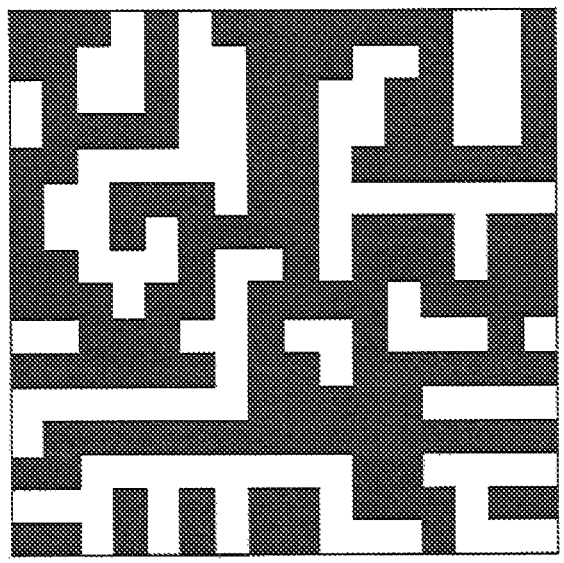
Figure 3:
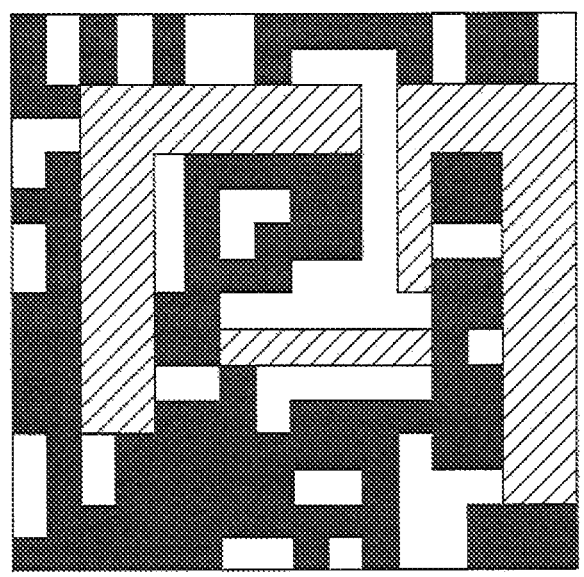
Figure 4:
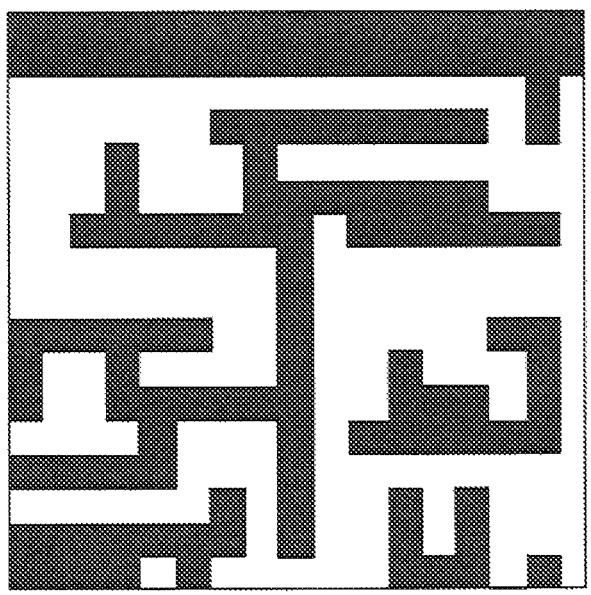

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EE-PROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 18 and FIG. 19 is provided as an example only, and it not intended to suggest any limitation as to the scope of use or functionality of alternate embodiments of the disclosed technology.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method, executed by at least one processor of a computer, of generating synthetic Integrated Circuit (IC) layout patterns, the method comprising:

accessing attribute values of the IC layout pattern features generated using IC layout patterns from at least one previous generation semiconductor fabrication technology node, wherein accessing the attribute values includes generating tail-biased probability distributions of the attribute values of the IC layout pattern features generated using the IC layout patterns from at least one previous generation semiconductor fabrication technology node, and sampling the generated tail-biased probability distributions of the attribute values to provide the attribute values for the features;

generating a synthetic layout pattern for use in a new generation semiconductor fabrication technology node under development by the following operations:

(a) assigning a random location in a grid for placement of a feature or portion of a feature constrained by the feature or portion of the feature and an attribute value associated with the feature or the portion of the feature, to provide a location for the feature or portion of the feature and the associated attribute value, wherein the attribute value associated with each feature or each portion of each feature is sampled from the tail-biased probability distribution for that attribute;

(b) checking the location against design rules for the new generation semiconductor fabrication technology node;

(c) changing the location to another random location if the location violates any design rule of the new generation semiconductor fabrication technology node, otherwise placing the feature or portion of the feature at the location that satisfies all design rules of the of the new generation semiconductor fabrication technology node;

(d) selecting a next feature/next portion of the feature for placement; and (e) performing operations (a) to (d) until determining that all features and portions of all features have been placed with all associated attribute values of the features and portions of the features.

2. The method of claim 1 wherein assigning the random location in the grid for placement of the feature or portion of the feature constrained by at least one attribute value comprises:
  limiting the assigned random location to one that maintains a relationship between the feature or portion of the feature and a second feature or portion of the second feature.

3. The method of claim 2 wherein the feature comprises a path and the portion of the second feature comprises a segment of the path.

4. The method of claim 3 wherein the second feature has an associated attribute value that defines dimensions of the segment.

5. The method of claim 2 wherein the feature comprises a path and the second feature comprises a path branch that is coupled to the path.

6. The method of claim 2 wherein the feature comprises a power rail having an associated attribute value of a single horizontal step across the grid and the second feature comprises a power rail branch that is coupled to the power rail at a random location along the power rail, wherein the power rail branch has an associated attribute value of a maximum number of vertical steps in the grid.

7. The method of claim 2 wherein the feature comprises a via enclosed metal having an associated attribute value of a single step in a horizontal direction in the grid and/or a single step in a vertical direction in the grid.

8. The method of claim 1 wherein changing the location to another random location if the location violates any design rule of the new generation semiconductor fabrication technology node further comprises:
  changing a direction in which the feature or portion of the feature is to extend in the grid.

9. The method of claim 1 wherein after performing operation (e):
  accessing the attribute values to provide new attribute values for the features; and then performing operations (a) through (e) to generate a second synthetic layout pattern.

10. The method of claim 1 wherein the feature or the portions of feature comprises a functional element and the attribute value comprises a values of a physical parameter of the feature.

11. The method of claim 10 wherein the feature or the portion of the feature includes a path, a path branch, a power rail, a power rail branch, or a via enclosed metal.

12. The method of claim 10 wherein the attribute values include a number of times the feature or portion of the feature is included in the synthetic layout pattern and/or a dimension of the feature or portion of the feature.

13. The method of claim 10 wherein changing the location to another random location if the location violates any design rule of the new generation semiconductor fabrication technology node further comprises:
  changing a location of at least one previously placed feature or portion of the feature in response to determining that the feature or the portion of the feature cannot be placed without violating at least one of the design rules.

14. The method of claim 10 wherein accessing the attribute values of the IC layout pattern features generated using IC layout patterns from at least one previous generation semiconductor fabrication technology node comprises:
  receiving input specified by a user including the attribute values of the IC layout pattern features generated using IC layout patterns from at least one previous generation semiconductor fabrication technology node.

15. The method of claim 1 further comprising:
  wherein accessing the attribute values of the IC layout pattern features generated using IC layout patterns from at least one previous generation semiconductor fabrication technology node comprises:
  receiving input including specified features and/or portions of specified features and specified attribute values of the specified features and/or portions of specified features to be included in the synthetic layout pattern independent of the IC layout pattern features generated using IC layout patterns from at least one previous generation semiconductor fabrication technology node.

16. The method of claim 1 wherein performing operations (a) to (d) until determining that all features and portions of all features have been placed with all associated attribute values of the features and portions of the features comprises:
  performing operations (a) to (d) until determining that all features and portions of all features have been placed with all associated attribute values of the features and portions of the features until reaching a predetermined termination criterion.

17. The method of claim 1 wherein generating synthetic Integrated Circuit (IC) layout patterns comprises generating the synthetic layout pattern for use in early design space exploration, developing a lithography recipe, designing pattern based test structures, designing pattern matching rules or design for manufacturability guidelines related to high-risk patterns, and/or developing hotspot detection models.

18. A method, executed by at least one processor of a computer, of generating synthetic Integrated Circuit (IC) layout patterns, the method comprising:
  accessing probability distributions of attribute values of the IC layout pattern features generated using IC layout patterns from at least one previous generation semiconductor fabrication technology node, wherein accessing the probability distributions of attribute values includes generating tail-biased probability distributions of the attribute values of the IC layout pattern features generated using the IC layout patterns from at least one previous generation semiconductor fabrication technology node, and sampling the generated tail-biased probability distributions of the attribute values to provide the attribute values for the features;
  generating a synthetic layout pattern for use in a new generation semiconductor fabrication technology node by the following operations:
  (a) placing a first portion of a layout pattern feature to include a selected attribute value for the first portion of the layout pattern feature, wherein the selected attribute value of the first portion is sampled from the tail-biased probability distribution of the attribute value for the first portion of the layout pattern feature being placed; and
  (b) moving the first portion of the layout pattern feature to a new location if placement of the first portion of the layout pattern feature with the selected attribute value violates any design rule for the new generation semiconductor fabrication technology node until the design rule is not violated.

* * * * *

UNITED STATES PATENT AND TRADEMARK OFFICE
CERTIFICATE OF CORRECTION

| | |
|---|---|
| PATENT NO. | : 11,449,658 B2 |
| APPLICATION NO. | : 16/681082 |
| DATED | : September 20, 2022 |
| INVENTOR(S) | : Reddy et al. |

It is certified that error appears in the above-identified patent and that said Letters Patent is hereby corrected as shown below:

In the Specification

Columns 7 and 8, Take Random Walk:
Please correct "1 | for i in range" to read -- 1 | for $\underline{i}$ in range --
Please correct "6 | | while step < StepCount" to read -- 6 | | while step < stepCount --

Signed and Sealed this
Thirty-first Day of January, 2023

Katherine Kelly Vidal
*Director of the United States Patent and Trademark Office*